US008094573B2

(12) United States Patent
Avidor et al.

(10) Patent No.: US 8,094,573 B2
(45) Date of Patent: Jan. 10, 2012

(54) METHOD OF MANAGING TRANSMISSION WITHIN A WIRELESS COMMUNICATIONS NETWORK

(75) Inventors: Dan Avidor, Little Silver, NJ (US); Jonathan Ling, North Brunswick, NJ (US)

(73) Assignee: Alcatel Lucent, Paris (FR)

( * ) Notice: Subject to any disclaimer, the term of this patent is extended or adjusted under 35 U.S.C. 154(b) by 1087 days.

(21) Appl. No.: 11/878,494

(22) Filed: Jul. 25, 2007

(65) Prior Publication Data

US 2009/0028119 A1    Jan. 29, 2009

(51) Int. Cl.
*H04L 12/26* (2006.01)
*H04L 12/413* (2006.01)
*H04W 4/00* (2009.01)

(52) U.S. Cl. .................. 370/252; 370/338; 370/445

(58) Field of Classification Search .................. None
See application file for complete search history.

(56) References Cited

U.S. PATENT DOCUMENTS

| 6,404,756 | B1 * | 6/2002 | Whitehill et al. | 370/338 |
| 6,556,582 | B1 * | 4/2003 | Redi | 370/443 |
| 2003/0012176 | A1 * | 1/2003 | Kondylis et al. | 370/337 |

FOREIGN PATENT DOCUMENTS

EP    1 768 438    3/2007

OTHER PUBLICATIONS

Lichun Bao et al., "Receiver-Oriented Multiple Access in Ad Hoc Networks with Directional Anteannas," XP001224848, 2005.
International Search Report and Written Opinion dated Nov. 19, 2008.
Israel Cidon and Moshe Sidi, "Distributed Assignment Algorithms for Multihop Packet Radio Networks," IEEE Transactions on Computers, vol. 38, No. 10, Oct. 1989.
"Wireless LAN medium access control (MAC) and physical layer (PHY) specifications," IEEE Standard 802.11-1997, The Institute of Electrical and Electronics Engineers, New York, NY, 1998.
I. Chlamtac, A. Farago, A.D. Myers, V.R. Syrotik, and G. Zaruba, "ADAPT: A Dynamically Self-Adjusting Media Access Control Protocol for AD HOC Networks," IEEE Global Telecommunications Conference—Globecom '99.
Jennifer C. Fang and George G. Kondylis, "A Synchronous, Reservation Based Medium Access Control Protocol for Multihop Wireless Networks," *Wireless Communications and Networking, 2003. WCNC 2003. 2003 IEEE* vol. 2, Mar. 16-20, 2003 pp. 994-998 vol. 2.
Imrich Chlamtac and Andras Farago, "Making Transmission Schedules Immune to Topology Changes in Multi-Hop Packet Radio Networks," IEE/ACM Transactions on Networking, vol. 2, No. 1, Feb. 1994.

(Continued)

*Primary Examiner* — Steven H Nguyen (74) *Attorney, Agent, or Firm* — Harness, Dickey & Pierce (57) ABSTRACT

The method includes sending a request for permission to transmit by each ready node in the wireless network. Each ready node is a node of the wireless network ready to transmit, each request identifies a node in the network that is the destination, and each request is sent over a control channel. An iterative process based on priorities determined for the ready nodes is then performed to determine which ready nodes to block from transmission and which ready nodes to clear for transmission. Transmissions are sent over a payload channel from ready nodes in the clear to transmit state.

36 Claims, 6 Drawing Sheets

OTHER PUBLICATIONS

R. Rozovski and P.R. Kumar, "SEEDEX: A MAC protocol for ad hoc networks," http://citeseer.ist.psu.edu/rozovsky01seedex.html.

Thyagaralan Nandagopal, et al., "Achieving MAC Layer Fairness in Wireless Packet Network," In *Proceedings of the sixth annual international conference on Mobile computing and networking*, pp. 87-98. ACM Press, 2000.

Giuseppe Bianchi, Performance Analysis of the IEEE 802.11 Distributed Coordination Function:, IEEE Journal on Selected Areas in Communications, vol. 18, No. 3, Mar. 2000.

Robert G. Gallager, "Information Theory and Reliable Communication," John Wiley and Sons, Inc, 1968.

Stavros Toumpis and Andrea J. Goldsmith, "New Media Access Protocols for Wireless Ad Hoc Networks Based on Cross-Later Principles," IEEE Trans. On Wireless Communications, vol. 5, No. 8, Aug. 2006.

X-Y. Li, P-J. Wan and Y. Wang, "Power Efficient and Sparse Spanner for Wireless Ad Hoc Networks." In *Proc. IEEE ICCCN 2001*.

R. Ramanathan and R. Rosales-Hain, "Topology Control of Wireless Networks using Transmit Power Adjustment," *Proc. IEEE INFOCOM 2000*, pp. 404-413.

A. Jiang and J. Bruck, "Monotone Percolation and the Topology Control of Wireless Networks," In *Proc. IEEE INFOCOM 2005*.

L. Li, J.Y. Halpern, P. Bahl, Y-M. Wang, and R. Wattenhofer, "A Cone-Based Distributed Topology-Control Algorithm for Wireless Multi-Hop Networks," *IEEEACM Transactions on Networking*, vol. 13, No. 1, pp. 147-159, Feb. 2005.

\* cited by examiner

METHOD OF MANAGING TRANSMISSION WITHIN A WIRELESS COMMUNICATIONS NETWORK

BACKGROUND

1. Field

Example embodiments of the present invention are related generally to a method of scheduling data transmission within a wireless communications network.

2. Description of the Related Art

Conventional wireless networks (e.g., WLAN, WAN, etc.) include a plurality of inter-connected nodes, with each node sharing a common wide band transmission channel. If multiple nodes in close proximity to each other transmit data at the same time, the respective data transmissions may interfere with each other, which may reduce throughput and degrade system performance.

A medium access control (MAC) protocol may be used to reduce the number of concurrent data transmissions at mutually interfering nodes in the network. A conventional MAC protocol allows only a subset of the nodes to transmit at any given time in order to reduce the number of "collisions" (e.g., interfering data transmissions).

Generally, a MAC algorithm seeks to schedule data transmissions so as to maximize the data throughput of the wireless network without prohibitive delays, and also to maintain a certain degree of fairness. However, executing a MAC protocol for large networks is difficult and inefficient.

SUMMARY OF THE INVENTION

The present invention relates to a method of managing transmission in a wireless network.

In one embodiment, the method includes sending a request for permission to transmit by each ready node in the wireless network. Each ready node is a node of the wireless network ready to transmit, each request identifies a node in the network that is the destination, and each request is sent over a control channel. A block operation is performed at each destination node such that each destination node selectively sends block messages to neighboring nodes based on respective transmission priorities for the ready nodes neighboring the destination node. The block messages instruct the neighboring node not to transmit. An announce operation is performed at each ready node to announce a transmission state of the ready node. The transmission state is one of a blocked-from-transmitting state and a cleared-to-transmit state. The blocked-from-transmitting state is a state in which at least one uncleared block message has been received by the ready node, and the cleared-to-transmit state is a state in which no uncleared block messages have been received at the ready node. A block/clear operation is performed at each destination node such that each destination node selectively sends block messages and clear messages to neighboring nodes based on the transmission state of each neighboring node. The clear message clears any block message previously sent by the destination node. The announce and block/clear operations are repeated for a number of iterations, and transmissions are sent over a payload channel from ready nodes in the cleared-to-transmit state.

BRIEF DESCRIPTION OF THE DRAWINGS

Example embodiments will become more fully understood from the detailed description provided below and the accompanying drawings, wherein like elements are represented by like reference numerals, which are given by way of illustration only and thus are not limiting of the present invention and wherein.

DETAILED DESCRIPTION OF EXAMPLE EMBODIMENTS

In order to better understand the present invention, an example wireless network will be described, followed by a description of a transmission scheduling process performed within the wireless Network. Then, a discussion of load on a control channel, which is used to support the transmission scheduling process, will be described.

Example Wireless Network

Figure 1:
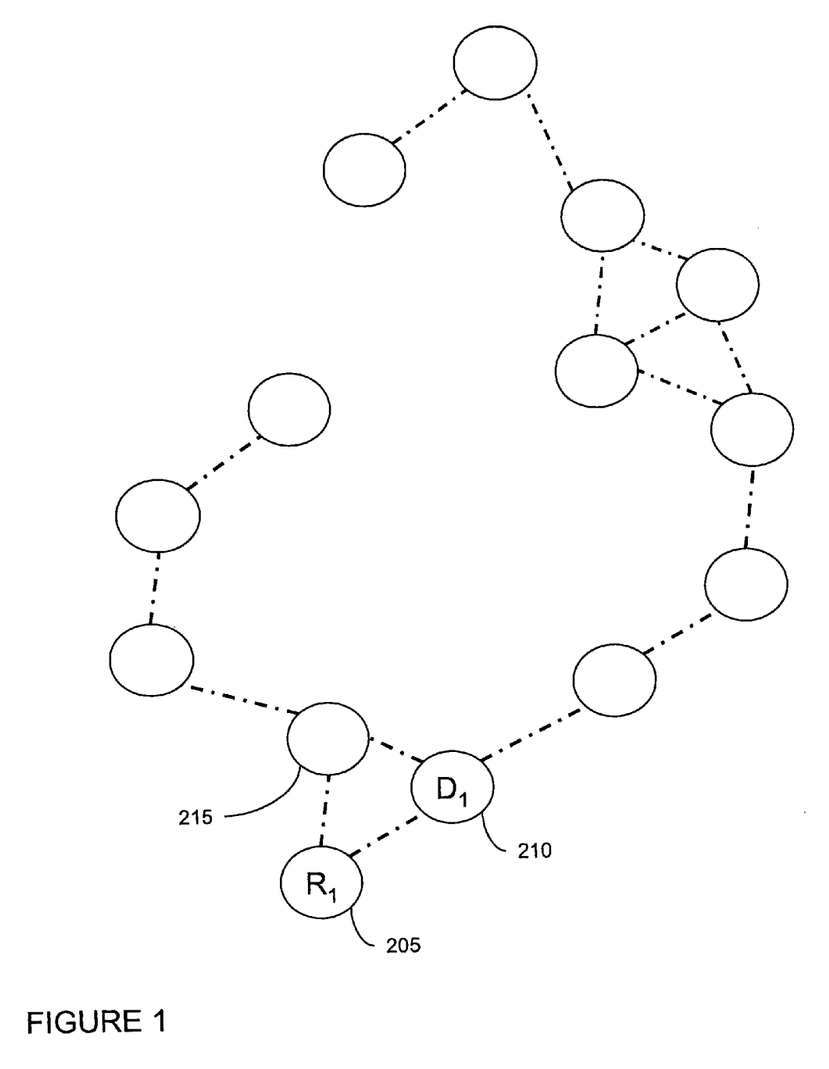
FIG. 1 illustrates a wireless network according to an example embodiment.

FIG. 1 illustrates a wireless network 200 according to an example embodiment.

In the example embodiment of FIG. 1, the wireless network 200 may be a WLAN, WAN, etc. and includes a plurality of nodes (e.g., mobile phones, laptop computers, handheld video game consoles with wireless connectivity, etc.). Neighbor nodes, or nodes which can communicate with each other directly, are illustrated as connected with dotted lines.

In the example embodiment of FIG. 1, node 205 is denoted as $R_1$ because node 205 is a "ready node" (e.g., a node attempting to transmit data to another node). In this example, assume node 205 intends to transmit data to node 210. Accordingly, node 210 is a "destination node" (e.g., a node to which another node intends to send data), and is denoted as $D_1$.

Network Assumptions

The assumptions regarding the wireless network 200 will now be described in greater detail.

For a given representative pair of nodes i and j (e.g., nodes 205 and 210), nodes i and j may either be classified as neighbors or "one-hop" neighbors if nodes i and j are capable of direct communication, or as non-neighbors.

In an example, if node i transmits to node j, which is a neighbor of node i, and a third node (e.g., node 215 in FIG. 2), which is a neighbor of node j, also transmits on the same timeslot, a "collision" occurs. In this example, if the collision occurs, it is assumed that node j will not receive any transmission from either of the mutually interfering nodes. In contrast, nodes that are not neighbors of node j may transmit on the same timeslot without causing a collision with node i's transmission to node j.

It is understood that in the "real world" classifying non-neighbors of node j as being incapable of interfering with reception at node j is not necessarily always the case. However, it will be hereafter assumed that non-neighbors of a given node (e.g., node k) are incapable of interfering with the given node within the context of example embodiments described below. This assumption is discussed below in greater detail.

It is further assumed that a node cannot receive and transmit during the same timeslot, and that each node within the wireless network 200 is "synchronized" such that timeslots and/or frames at each node in the wireless network are aligned.

Further, the example embodiments described below are not addressing "routing" of messages (i.e., choosing a complete multi-hop route from the node generating a message to the destination node), but rather are limited to one-hop data transfers between neighbor nodes within the wireless network 200. However, it will be readily appreciated that a higher-level routing protocol could be implemented within example embodiments in the sense that multiple "hops" may be executed (e.g., in consecutive timeslots) pursuant to the higher-level routing protocol.

Further, if the number of nodes requesting permission to transmit in a given timeslot is denoted as $N_1$ and the number of nodes granted permission to transmit in the given timeslot is denoted as $N_2$, then $N_2/N_1$ is a metric that may be used to evaluate the utilization or efficiency of the example transmission scheduling process, as will now be discussed in greater detail.

Example Transmission Scheduling Process

Figure 2:
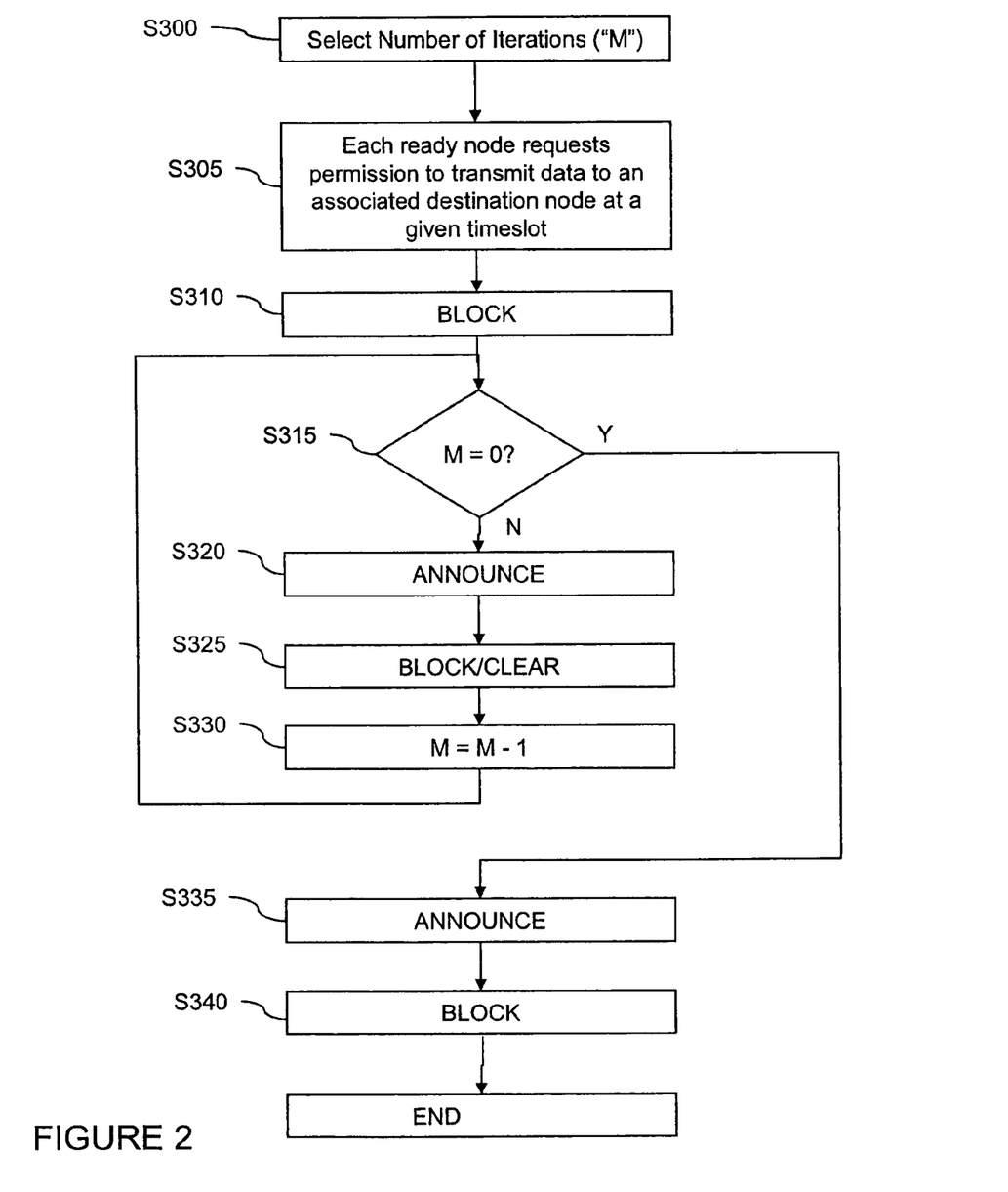
FIG. 2 illustrates a transmission scheduling method according to an example embodiment.

FIG. 2 illustrates a transmission scheduling method according to an example embodiment.

Within the example embodiment of FIG. 2, it is assumed that communication (e.g., data transmission) only occurs between nodes and neighbors of these nodes. Accordingly, each node is assumed to ignore all data transmissions from any non-neighbor node (e.g., as discussed above, it is assumed that non-neighbors cannot interfere with each other). It is further assumed that each node knows the priority number (PN) of each of its respective neighbor nodes for a given timeslot (e.g., a next time slot, a time slot for which transmission permissions are being scheduled, etc.). The PN is discussed in greater detail below.

Figure 3:
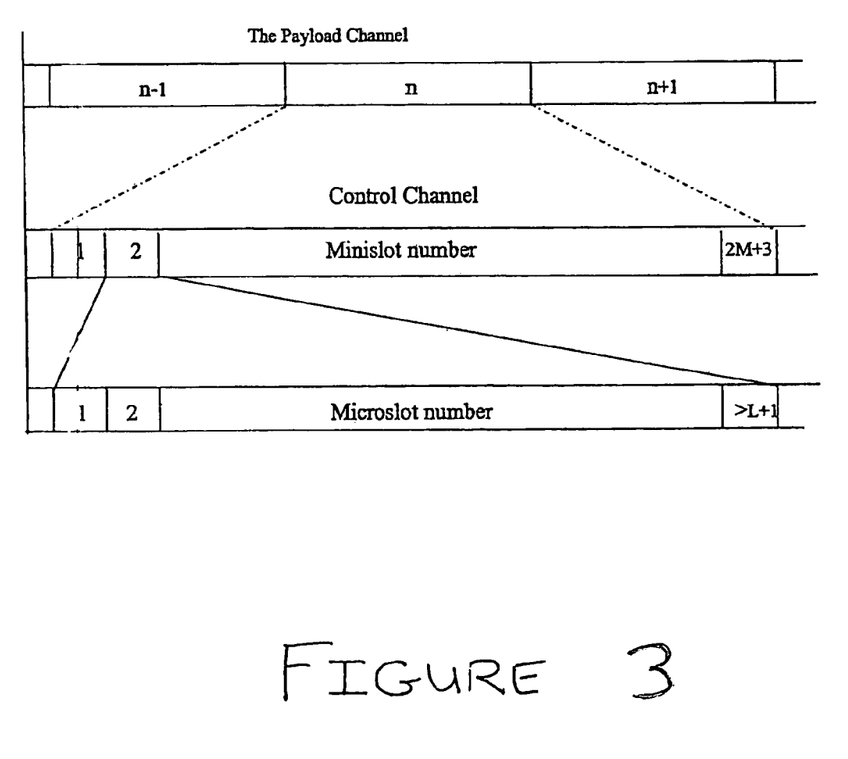
FIG. 3 illustrates an example embodiment of the time division structure employed by the method of FIG. 2.

FIG. 3 illustrates an example embodiment of the time division structure employed by the method of FIG. 2. In particular, FIG. 3 shows a payload channel and a control channel employed in the network 200 of FIG. 1. In the example embodiment of FIG. 3, the "payload channel" (e.g., alternatively referred to as "data channel") corresponds to the time interval or frequency band allocated for the data channel, and the "control channel" corresponds to time interval or frequency band upon which control messages are transmitted between the respective nodes within the network 200. In an example, the payload channel and the control channel are orthogonal to each other, such that control channel transmissions do not interfere with payload channel transmissions.

As shown in the example embodiment of FIG. 3, for each timeslot or data frame in the payload channel (e.g., where one fixed-length data packet may be transmitted), the control channel includes a plurality of minislots. Each minislot includes a plurality of microslots. The control channel and its associated minislots and microslots will be described in greater detail below.

Returning to the example embodiment of FIG. 2, it is assumed that the first minislot within a given data frame or timeslot is reserved for nodes to announce their request for permission to transmit data during a future timeslot (e.g., the next timeslot or data frame), as well as identifying the destination node associated with the requested data transmission.

In an example, as will be discussed in greater detail below, data transmission requests may be issued on separately assigned microslots within the reserved or first minislot.

In the example embodiment, R may be used to denotes a set of all ready nodes (i.e., nodes requesting to transmit to destination nodes), D may be used to denotes the set of associated destination nodes, "transmit nodes" denote ready nodes that are neighbors of a destination node under consideration, "receive nodes" denote destination nodes that are neighbors of a ready node under consideration, a "Block" command corresponds to a message or instruction sent to a ready node (e.g., over a control channel, which is discussed below in greater detail) instructing the ready node not to transmit and a "Clear" command cancels a Block message previously sent by the node issuing the "Clear" command. Accordingly, if more than one node blocks a ready node from transmitting, it will be appreciated that a Clear command from a single node may not grant the ready node permission to transmit (e.g., unless each node previously sending Block commands issue subsequent Clear commands). Further, it will be appreciated that R and D may overlap, such that a node may qualify as both a ready node and a destination node.

In the example embodiment of FIG. 2, in step S300, a network designer selects a number M of iterations for the transmission scheduling method of FIG. 2. Generally, the network designer selects a positive integer as an initial value for M. As will be described below in greater detail, higher values of M correspond to higher utilization for the network 200 (e.g., because more ready nodes may be granted permission to transmit without collisions). However, higher values of M are also associated with higher processing load (e.g., higher overhead) such that the network designer may select the value of M based on a tradeoff between utilization and processing load.

In the example embodiment of FIG. 2, in step S305, each ready node requests permission to transmit data to a selected destination node at a given timeslot (e.g., a next timeslot, a future timeslot, etc.). As discussed above, in an example, each ready node may request permission to transmit data in step S305 at an assigned microslot (e.g., the microslot assignment process is described in greater detail below) within the reserved minislot on the control channel.

In the example embodiment of FIG. 2, in step S310, each destination node performs a BLOCK operation. The BLOCK operation step S310 will now be described in greater detail with respect to FIG. 4.

Figure 4:
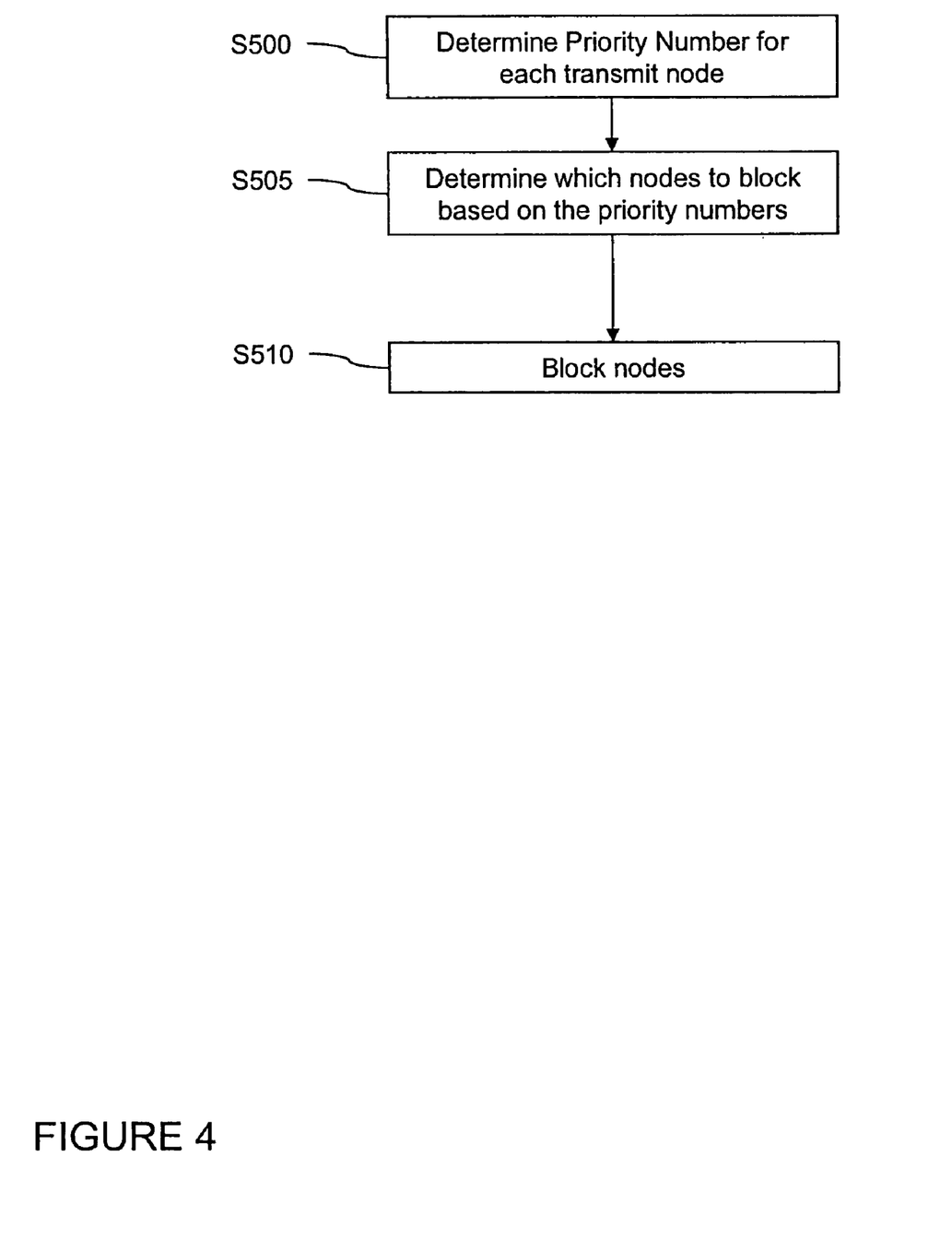
FIG. 4 illustrates a block operation performed during the process of FIG. 2 according to an example embodiment.

FIG. 4 illustrates the BLOCK operation step S310 according to an example embodiment. In the example embodiment of FIG. 4, in step S500, each destination node among the D destination nodes determines the priority number for the set of transmit nodes associated with the destination node. If a destination node is also a ready node, the destination node may also determine a priority number for itself. Example methodologies for calculating the priority number will be described in greater detail below.

In the example embodiment of FIG. 4, in step S505, each destination node determines which node(s) to block based on the determined priority numbers from step S500. Then, in step S510, each destination node blocks the nodes determined in step S505.

More specifically, the destination node determines the ready node with the highest priority number among the set containing the ready nodes neighboring the destination node and the destination node, if the destination node is a ready node. The destination node determines to block the ready nodes requesting permission to transmit to the destination node if the destination node is determined to have the highest priority number among the set; determines to block the ready nodes neighboring the destination node that have requested permission to transmit to the destination node if the ready node determined to have the highest priority number among the set has requested permission to transmit to a node other than the destination node; and determines to block the ready nodes neighboring the destination node, except for the ready node determined to have the highest priority number among the set, if this node requested permission to transmit to the destination node. The destination node then send block messages to the nodes determined to be blocked.

Returning to the example embodiment of FIG. 2, after the BLOCK operation step S310, the process advances to step S315. In step S315, each node within the network 200 determines whether the iteration counter M equals 0. If M is determined to equal 0, the process advances to step S335; otherwise, the process advances to step S320.

In step S320, each ready node within the network 200 performs an ANNOUNCE operation. The ANNOUNCE operation of step S320 will now be described in greater detail with reference to FIG. 5.

Figure 5:
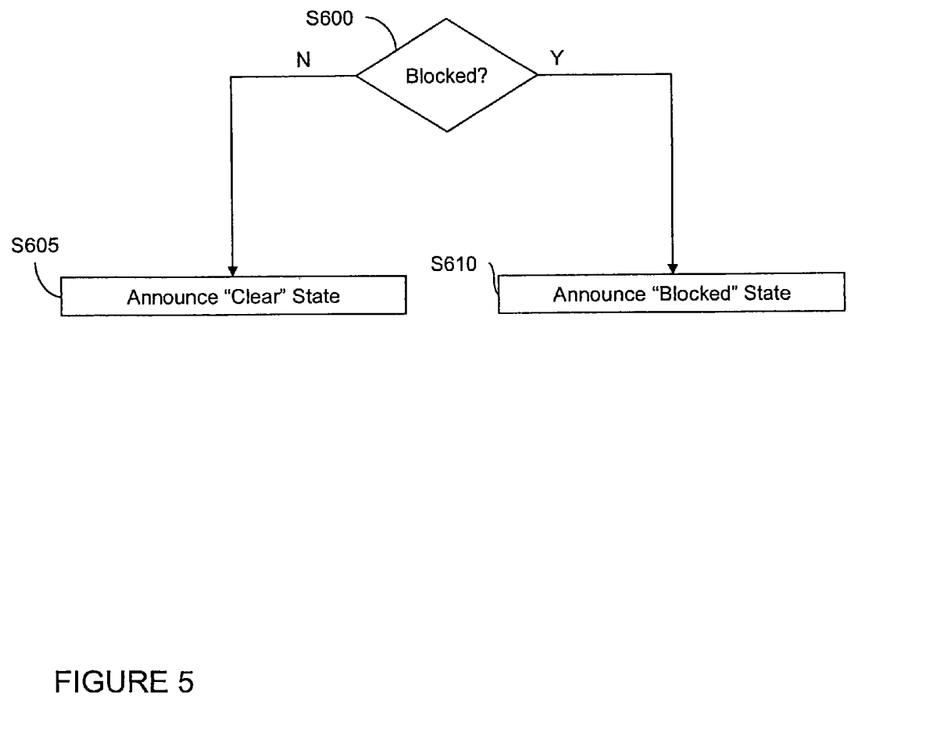
FIG. 5 illustrates an announce operation performed during the process of FIG. 2 according to an example embodiment.

FIG. 5 illustrates the ANNOUNCE operation step S320 of FIG. 2 according to an example embodiment.

In the example embodiment of FIG. 5, in step S600, each ready node determines whether it is blocked. A ready node is blocked if it received one or more "block" messages (e.g., in step S310, during a past iteration of step S325 which is discussed below, etc.), and did not receive associated "clear" messages. A ready node is not blocked if it received a clear message associated with each block message, or it did not receive any block messages. If a ready node is clear, then the node "announces" to its neighbor nodes (e.g., via control channel messaging) that it is in a clear to transmit data state in step S605. Otherwise, if the ready node determines that it is blocked, the ready node announces to its neighbor nodes (e.g., via control channel messaging) that the ready node is in a blocked from transmission state (e.g., not clear to transmit data) in step S610.

Returning to the example embodiment of FIG. 2, in step S325, each destination node performs a BLOCK/CLEAR operation. The BLOCK/CLEAR operation of step S325 will now be described in greater detail with reference to FIG. 6.

Figure 6:
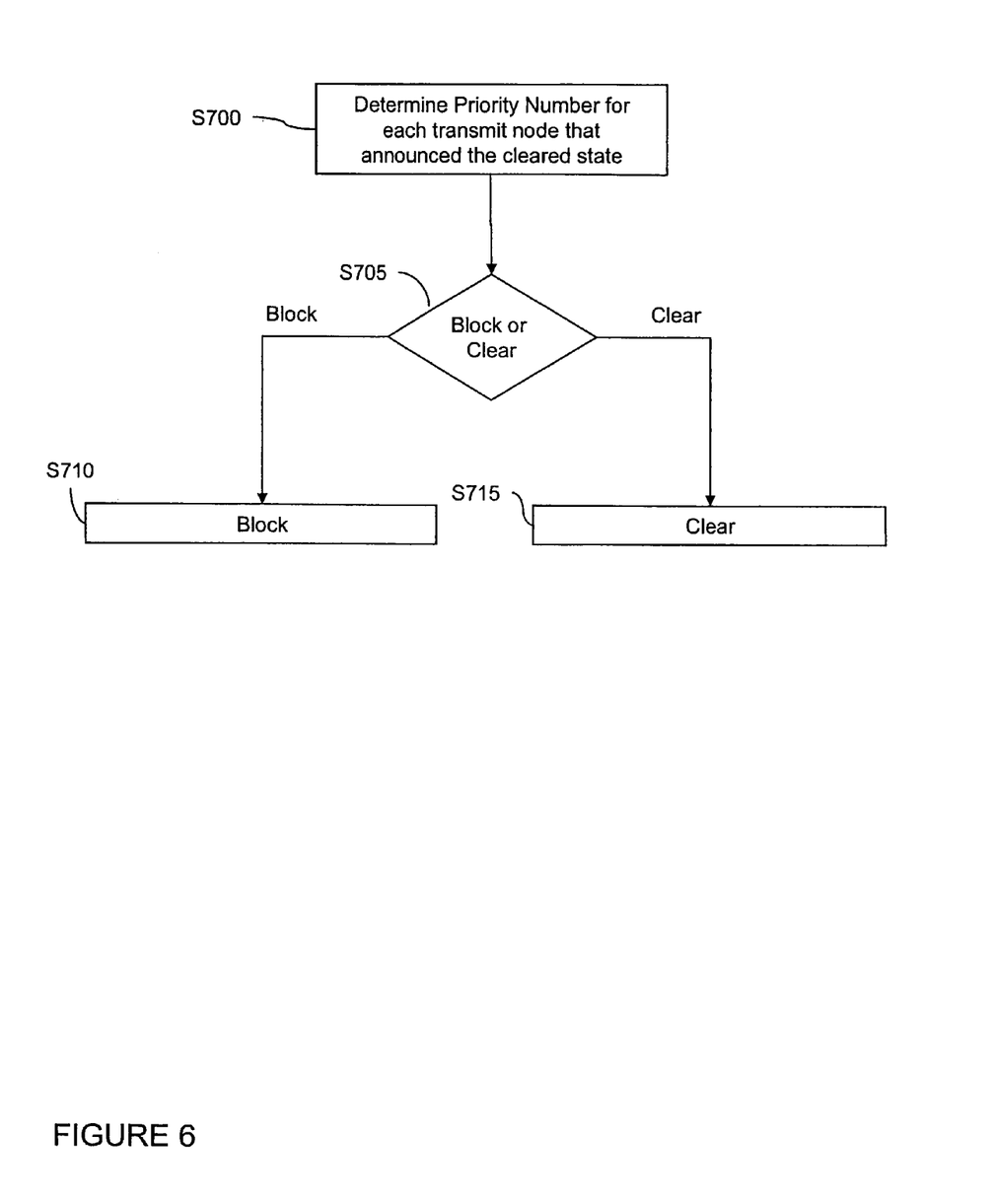
FIG. 6 illustrates a block/clear operation performed during the process of FIG. 2 according to an example embodiment.

FIG. 6 illustrates the BLOCK/CLEAR operation of step S325 according to an example embodiment. In the example embodiment of FIG. 6, in step S700, each destination node among the D destination nodes determines the priority number for each of its neighboring transmit nodes. If a destination node is also a ready node, the destination node determines the priority number for itself also. Example methodologies for calculating the priority number will be described in greater detail below.

In the example embodiment of FIG. 6, in step S705, each destination node determines whether to block or clear certain nodes based on the determined priority numbers for the set of nodes in step S700. If step S705 determines to block one or more of the ready nodes, the process advances to step S710 and the node or nodes are blocked (e.g., via messaging on the control channel). Otherwise, if step S705 determines to clear one or more of the ready nodes, the process advances to step S715 and the node or nodes are cleared (e.g., via messaging on the control channel).

More specifically, the destination node determines the ready node with the highest priority number among a set containing the ready nodes neighboring the destination node and the destination node, if the destination node is a ready node; determines to block the ready nodes requesting permission to transmit to the destination node if the destination node is determined to have the highest priority number among the set; determines to block the ready nodes neighboring the destination node that have requested permission to transmit to the destination node if the ready node determined to have the highest priority number among the set has requested permission to transmit to a node other than the destination node; determines to block the ready nodes neighboring the destination node, except for the ready node determined to have the highest priority number among the set, if this node requested permission to transmit to the destination node; determining to clear the ready nodes neighboring the destination node that have requested permission to transmit to a node other than the destination node if no nodes neighboring the destination node are in the cleared to transmit state and the ready node with the highest priority number requested permission to transmit to a node other than the destination node; and determines to clear an identified node neighboring the destination node if no nodes neighboring the destination node are in the cleared to transmit state and the identified neighboring node requests permission to transmit to the destination node, the identified neighboring node being the node neighboring the destination node with the highest priority number.

Returning to the example embodiment of FIG. 2, after the BLOCK/CLEAR operation of step S325, the value of the iteration counter M is decremented (e.g., by one). The process returns to step S315 and the above-described repeats until step S315 determines that M equals 0.

As discussed above, after M is determined to equal 0 in step S315, the process advances to step S335. In step S335, the ANNOUNCE operation (e.g., see step S320) is performed again, followed by the BLOCK operation (e.g., see step S305), and the process of FIG. 2 terminates until being executed again for a scheduling of data transmissions for another timeslot. If M is large enough, the method converges. After the method has converged, addition of another node will cause collision. Furthermore, replacement of a node permitted to transmit with a node having a higher priority will also cause collision.

Following the execution of the process of FIG. 2, ready nodes which have been "cleared", transmit data on the data channel in the given timeslot (e.g., a next timeslot). It will be appreciated from the above description of the process of FIG. 2 that a "cleared" ready node may either never have been blocked or may have been blocked and later cleared by each node which had previously blocked it. A set of nodes $\Psi$ may denote the resultant "cleared" set of nodes after the process of FIG. 2.

During the execution of the process of FIG. 2, each step requiring an exchange of control messaging is assumed to consume or cost one "minislot" of time (e.g., see discussion of FIG. 3, above). In an example, steps S305, S310, S320, S325, S335 and S340 each consume or cost one minislot within the time interval allocated to the control channel in each timeslot.

From a review of the process of FIG. 2, it will be appreciated that if acknowledgements (ACKs) from destination nodes are desired, a time interval may be allocated for this purpose (e.g., at the end of each timeslot). The ACK messaging may be performed on the payload channel right after the data itself, but in the opposite direction. It is easy to verify that since data packets don't collide, the same will be true for the ACK messages.

Further, the method of FIG. 2 is efficient in the sense that any nodes added to the set $\Psi$ (i.e., the set of nodes cleared to transmit) after the execution of the method will cause a collision.

Priority Management

Good overall throughput performance may not necessarily correlate with fairness. For example, nodes with a relatively small number of neighbors may expect permission to transmit more often than nodes having many neighbors. While obtaining equal degrees of fairness among nodes may not be possible, the use of priority management via priority numbers may increase the degree of fairness within the network and lower the delay jitter.

The example method of FIGS. 2 through 6 have been above-described as based upon a determination of node priority (i.e., the priority number). An example of calculating priority numbers for nodes will now be described in greater detail.

Initially, assume that each node within network 200 includes an identical maximal length binary feedback shift register (FSR), which, when clocked at the timeslot rate, generates each element of the field of polynomials $GF(2^m)$ except the "0" polynomial, where m is a positive integer. The feedback network of the FSR implements an irreducible polynomial of degree m (where m is greater than 1), which is the minimal polynomial of the field element $\alpha=t$. The polynomial t is therefore a primitive element of the field, and each non-zero element of the field may be represented as t raised to a certain power: $1, t, t^2, \ldots, t^{2^m-2}$. The multiplication operation may be performed as conventional polynomial multiplication modulo the feedback polynomial. The periodic binary sequences generated by the FSRs of different nodes are identical, but each node has a distinct phase (e.g., a shift with respect to the first node). For simplicity of description, assume that the FSR of each node is initialized concurrently (e.g., simultaneously), with each node having a different initial phase ("seed"), which is the "serial number" of the node. Further assume that each node has a unique serial number (e.g., $2^m-1 > N$).

The binary number stored in the m stage FSR of each node during the current timeslot is the node's current priority number (PN). Each node may then determine the PN of its neighbors based on the serial numbers of the respective neighbors at any given timeslot. A node i (e.g., having the serial number i) may calculate the current PN of node j by multiplying its own current PN by $t^{j-i}$ (note, $t^{-k}=t^{2^m-k-1}$). In an example, the multiplication of two such elements in a field of polynomials modulo f(D) may be executed in hardware.

Accordingly, a node may calculate the PN of its neighbors in the coming timeslot based on its own serial number, the serial number of its neighbors, and its current PN. However, due to mobility, the set of neighbors of any node may change in time, and therefore "refreshing" the priority information (e.g., sending serial number and/or current FSR values between the nodes) may be performed periodically (e.g., every a certain number of time slots, etc.).

In order to add a new node to the network, the new node is allocated a unique serial number and then "clocked forward" until the new node is synchronized with the first node (e.g., the number of "clocks" since the initiation of the network or priority management process). The "clock forward" or synchronizing operation may be performed via multiplication with the polynomial t raised to the corresponding power.

Accordingly, the PN of each node may cycle through all $2^m-1$ values of the finite field. Further, let $PN_n(T)$ be the PN of node n at timeslot T. Then, for any subset $\Phi$ of nodes, with cardinality $C_\Phi \leq N$, and any node $i \in \Phi$, arbitrary t, and m large (e.g., m>15), the following is true with high probability:

$$\frac{1}{2^m-1} \sum_{T=t+1}^{t+2^m-1} 1_{i,\Phi}(T) \approx \frac{1}{C_\Phi} \qquad \text{Equation 1}$$

where $$1_{i,\Phi}(T) \equiv \begin{cases} 1, & PN_i(T) > \max_{\substack{j \in \Phi \\ j \neq i}}(PN_j(T)) \\ 0, & PN_i(T) < \max_{\substack{j \in \Phi \\ j \neq i}}(PN_j(T)) \end{cases}$$

Accordingly, over a complete period of $2^m-1$ timeslots, the PN of any node may be larger than the PN of any other node in $\Phi$ approximately $1/C_\Phi$ times. It will be appreciated that determining the priority number in this manner may increase the degree of fairness during the execution of the method of FIG. 2.

Further, while a very specific process for calculating priority numbers of nodes has been described above, it will be appreciated that other example embodiments may calculate priority numbers in any well-known manner.

Control Channel Management

The example method of FIG. 2 has been above described with reference to messaging on the control channel. The control channel and its associated messaging will now be described in greater detail.

The Control Channel

We assume that the control channel is orthogonal to the payload channel, so that control messages can be transmitted on the control channel, while data can be transmitted on the data channel during the same timeslot with no mutual interference. This can be accomplished in many known ways, e.g., through TDMA, i.e., dividing each timeslot to two non-overlapping time intervals, through FDM, i.e., assigning different segments of the spectrum to the two channels, or even through OFDM, where a different sub-carrier can be assigned to support one minislot of the control channel, and each microslot (see below) is implemented as a different time interval on one of the sub-carriers). Whatever the implementation is, we, for convenience, talk about minislots and microslots, as though they are time intervals.

The description of the example method of FIG. 2 makes an implicit assumption that non-neighbors of a node (e.g., node j) cannot interfere with data reception at the node. In the "real world", this assumption may not necessarily be true. For example, in addition to the set of neighbors of node j, other nodes may also interfere with reception at node j. This type of non-neighbor interference may be reduced if the control channel is configured to have a longer communication range than the payload or data channel (e.g., by reducing the data rate, using a more robust modulation scheme and/or reducing the coding rate on the control channel) as compared to the payload or data channel.

As discussed above with respect to FIG. 3, the control channel is divided to timeslots, which, for simplicity, may be assumed to overlap with the timeslots of the payload channel as shown in FIG. 3.

In an example, referring to the example embodiment of FIG. 3, during timeslot n−1, the method of FIG. 2 may be executed on the control channel, and may produce the set of nodes permitted to transmit data packets on the payload channel during timeslot n. Each timeslot of the control channel contains 2M+4 (for M>0, or 2 if M=0) minislots, and each minislot is divided into J>L+1 microslots, where L is the largest number of two-hop neighbors (i.e., nodes that can be reached by at most two-hops) of any node in the network. Each node is assigned one microslot for transmission during each minislot, which is not shared by any of its two-hop neighbors. Each node may therefore transmit to its one-hop neighbors with no collisions.

Auxiliary Contention Channel

Distributed management of the control channel will now be described in accordance with an example embodiment. In an example, the microslot assignments described below are repeated from time-to-time because the set of, for example, two-hop neighbors changes as a result of node mobility.

As explained above, some minislots are used by ready nodes to transmit control messages to destination nodes, while the rest are used by destination nodes to transmit control messages to ready nodes. To prevent collisions between such transmissions, each minislot is broken down to microslots and a different microslot is assigned to all one and two hop neighbors of each node. In this example embodiment, a contention channel is provided for this purpose. The contention channel is another orthogonal channel (e.g., different time segment, different frequency, etc. from the other channels). Using the contention channel, each node advertises its own microslot, and the microslots used by its one-hop neighbors. The message or advertisement is transmitted relatively infrequently in comparison to the duration of a timeslot, by each node at random times. By monitoring the advertisements of its neighbors, a node may detect conflicts with the assignments of its one-hop and/or two-hop neighbors. If a conflict is detected, a replacement microslot may be randomly selected from among the set of microslots not yet assigned to one of its one or two hop neighbors.

Next, the node advertises the new assignment. Success is not guaranteed in one step, because the same conflict is detected by all nodes involved, and these nodes may attempt concurrent re-assignments to the same microslot. However, when the number of microslots per minislot is sufficiently larger than the maximum number of two-hop neighbors of any node in the network, success is practically guaranteed within several attempts. Note, also, that the mean number of two-hop neighbors is typically lower than the maximum number. The assignment process may be ongoing simultaneously in diverse parts of the network with small localized and temporal effects. Assuming that the network changes slowly, the contention channel should not occupy a significant fraction of the total capacity available to the network.

Load on the Control Channel

As explained above, the iterative method of FIG. 2 uses a series of inter-node message exchanges to establish a transmission scheduling among the nodes of network 200. To correctly process a message, a node receiving a message must determine the identity of the transmitting node.

As discussed above, nodes transmit on the control channel in their appointed microslots, and it is assumed that each neighbor node is aware of the microslot assignments (e.g., through periodic advertisements on the contention channel as discussed above), such that identifying the sender of a message is simply based on the microslot the message is received on With the above assumptions, the Block messages include space to identify one neighboring node, and another bit to specify the required action. An "Announce" messages include a single bit (e.g., because the source identifier is implicit based on the microslot) to indicate whether or not the sending node is blocked. The "Block/Clear" messages include sufficient space to identify one neighboring node plus two bits. The two bits are required to distinguish between the possible situations discussed above with respect to step S325 and FIG. 6.

Accordingly, it will be appreciated that the first minislot contains sufficient space for J nodes to identify their destination nodes. Assuming A bits are required to identify a given node, this means the first minislot may include at least AJ bits. The second minislot (M=0) requires at least J(A+1) bits, $M \geq 1$ requires at least JA+(A+1)J+MJ+MJ(A+2)+J+(A+1) J=3J(A+M+1)+JAM bits. In an example, if M=1, A=8, J=20, then 760 bits may be required per timeslot.

With regard to the space (e.g., the number of bits) for the address field to identify a given node (e.g., a destination node), it will be appreciated that a unique identification for each node of the network 200, is not really required, because communication, as described above, is limited to one-hop and/or two-hop neighbors. Accordingly, the space for the address field need only be sufficient for "local" unique identification. For example, the address field may be configured to include $\log_2 J$ bits. In this example, the address stored within the address field may be the index of the microslot assigned the identified node (e.g., which is known to its respective neighbor nodes).

Further, it is understood that the above bit-length examples related to the load on the control channel are given for example purposes only, and "real world" data loads on the control channel may include additional bits, for example, related to a preamble, synchronization, etc. The method of FIG. 2 may also take into account fixed time intervals for propagation delays, and switching time (e.g., switching of a node from transmit mode to receive mode). Accordingly, the overhead for the control channel may be higher than the examples given above in real world scenarios. Thus, based on case-specific network parameters, the higher load may lead, in some cases, to excessive overhead.

In an example, the node degree (i.e., the highest number of neighbors for any node in the network) may be limited via local topology control. Topology control is a preparatory process carried out before routing is attempted. Topology control is used by designers of wireless packet networks to lower the node degree, simplify routing and lower the nodes' energy consumption, while preserving strong connectivity. Topology control may reduce or shorten longer branches from routing paths by replacing the longer branches with a series of short hops. The traffic into and out of each node is then routed via a reduced set of neighbors. The number of two-hop neighbors is also thereby reduced. Topology control may also be implemented in a distributed fashion, such that each node may independently execute its respective topology control process. Topology control is well-known in the art and will not be discussed further for the sake of brevity.

In another example, the load or traffic on the control channel may be reduced by grouping a number of timeslots into a single, longer frame. The method of FIG. 2 may then be executed once per frame. The control channel messaging for each combined frame may carry information associated with data transmission scheduling for the entirety of the longer frame. The information content of each control channel message scales with the number of timeslots per frame, but other parameters (e.g., synchronization bits, the "dead" time intervals during which no data is transmitted, etc.) are not necessarily affected, such that the control channel load per timeslot goes down. However, grouping frames in this manner may increase the delay.

Example embodiments of the present invention being thus described, it will be obvious that the same may be varied in many ways. For example, while above-described example embodiments are directed to wireless networks, it is understood that other example embodiments of the present invention may be directed to any wireless network having at least a portion being wireless compliant. For example, while not explicitly shown in FIG. 2, any given node in the example wireless network 200 described above may further be connected to an Internet source, a telecommunication source, etc.

Such variations are not to be regarded as a departure from the spirit and scope of the exemplary embodiments of the invention, and all such modifications as would be obvious to one skilled in the art are intended to be included within the scope of the invention.

What is claimed:

1. A method of managing transmission in a wireless network, comprising:
   sending a request for permission to transmit by each ready node in the wireless network, each ready node being a node of the wireless network ready to transmit, each request identifying a node in the network that is the destination, and each request being sent over a control channel;
   performing a block operation at each destination node such that each destination node selectively sends block messages to neighboring nodes based on respective transmission priorities for the ready nodes neighboring the destination node, the block message instructing the neighboring node not to transmit;
   performing an announce operation at each ready node to announce a transmission state of the ready node, the transmission state being one of a blocked from transmitting state and a cleared to transmit state, the blocked from transmitting state being a state in which at least one uncleared block message has been received by the ready node, and the cleared to transmit state being a state in which no uncleared block messages have been received at the ready node;
   performing a block/clear operation at each destination node such that each destination node selectively sends block messages and clear messages to neighboring nodes based on the transmission state of each neighboring node, the clear message clearing any block message previously sent by the destination node;
   repeating the announce and block/clear operations for a number of iterations; and
   sending transmissions over a payload channel from ready nodes in the clear to transmit state.

2. The method of claim 1, wherein
   the control channel is divided into timeslots, each timeslot is divided into minislots, and each minislot is divided into microslots; and
   the request for permission to transmit sent by each ready node is sent at an assigned microslot.

3. The method of claim 2, further comprising:
   advertising, by each node, assignment of microslots to the node and to one-slot neighbors of the node over a contention channel;
   detecting conflicts with microslot assignments;
   choosing randomly a replacement microslot from unused microslots if a conflict is detected.

4. The method of claim 1, wherein the block operation at each destination node comprises:
   determining a priority number for each ready node neighboring the destination node;
   determining a priority number for the destination node if the destination node is also a ready node;
   determining nodes to be blocked based on the determined priority numbers; and
   sending a block message to each of the nodes determined to be blocked.

5. The method of claim 4, wherein the determining nodes to be blocked step comprises, for each destination node:
   determining the ready node with the highest priority number among a set containing the ready nodes neighboring the destination node and the destination node, if the destination node is a ready node;
   determining to block the ready nodes requesting permission to transmit to the destination node if the destination node is determined to have the highest priority number among the set;
   determining to block the ready nodes neighboring the destination node that have requested permission to transmit to the destination node if the ready node determined to have the highest priority number among the set has requested permission to transmit to a node other than the destination node; and
   determining to block the ready nodes neighboring the destination node, except for the ready node determined to have the highest priority number among the set, if this node requested permission to transmit to the destination node.

6. The method of claim 1, wherein the announce operation at each ready node comprises:
   sending an announce message indicating the ready node is in the blocked from transmission state if the ready node has received at least one uncleared block message; and
   sending an announce message indicating the ready node is in the cleared to transmit state if the ready node has not received at least one uncleared block message.

7. The method of claim 1, wherein the block/clear operation is performed at each destination node such that each destination node selectively sends block messages or clear messages to neighboring nodes based on the transmission state of each neighboring node and the transmission priority of each neighboring node.

8. The method of claim 1, wherein the block/clear operation performed comprises, for each destination node:
   determining a priority number for each ready node neighboring the destination node;
   determining a priority number for the destination node if the destination node is also a ready node;
   determining the ready node with the highest priority number among a set containing the ready nodes neighboring the destination node and the destination node, if the destination node is a ready node;
   determining to block the ready nodes requesting permission to transmit to the destination node if the destination node is determined to have the highest priority number among the set;
   determining to block the ready nodes neighboring the destination node that have requested permission to transmit to the destination node if the ready node determined to have the highest priority number among the set has requested permission to transmit to a node other than the destination node;
   determining to block the ready nodes neighboring the destination node, except for the ready node determined to have the highest priority number among the set, if this node requested permission to transmit to the destination node;

determining to clear the ready nodes neighboring the destination node that have requested permission to transmit to a node other than the destination node if no nodes neighboring the destination node are in the cleared to transmit state and the ready node with the highest priority number requested permission to transmit to a node other than the destination node; and determining to clear an identified node neighboring the destination node if no nodes neighboring the destination node are in the cleared to transmit state and the identified neighboring node requests permission to transmit to the destination node, the identified neighboring node being the node neighboring the destination node with the highest priority number.

9. The method of claim 1, further comprising:
sending, from each destination node receiving a transmission on the payload channel, an acknowledgement over the payload channel.

10. The method of claim 4, wherein the determining a priority number for each ready node step determines each priority number based on a serial number of the ready node.

11. The method of claim 10, wherein the determining a priority number for each ready node step determines each priority number based on a serial number of the ready node and the serial number of the destination node.

12. The method of claim 4, wherein the determining a priority number for the destination node step determines the priority number based on a serial number of the destination node.

13. The method of claim 4, wherein the determining a priority number for each ready node step uses a feedback shift register at each ready node to generate a different priority number for each ready node.

14. The method of claim 13, wherein the feedback shift register is clocked at the timeslot rate.

15. The method of claim 4, wherein the determining a priority number for the destination node step uses a feedback shift register at the destination to generate the priority number.

16. The method of claim 14, wherein the feedback shift register is clocked at the timeslot rate.

17. The method of claim 1, wherein the control channel and payload channel are orthogonal channels.

18. A method of managing transmission in a wireless network, comprising:

sending a request for permission to transmit by each ready node in the wireless network, each ready node being a node of the wireless network ready to transmit, each request identifying a node in the network that is the destination, and each request being sent over a control channel;

determining, at each destination node, transmission priorities for neighboring nodes that are ready nodes;

selectively sending, by each destination node, block messages and clear messages to the neighboring nodes that are ready nodes based on the determined transmission priorities and announced states of the neighboring nodes that are ready nodes, the block message instructing the neighboring node not to transmit, the clear message clearing any block message previously sent by the destination node, and each announced state indicating whether the ready node is blocked or cleared to transmit; and sending transmissions over a payload channel from ready nodes in the clear to transmit state after more than one iteration of the determining and selectively sending steps.

19. A method of managing transmission in a wireless network at a destination node, comprising:

receiving, at a destination node, a request for permission to transmit from at least one ready node, the request being sent over a control channel;

performing a block operation by selectively sending block messages to at least one neighboring node based on transmission priorities for the at least one ready node, the block message instructing the at least one neighboring node not to transmit;

receiving an announcement of a transmission state from the at least one ready node, the transmission state being one of (i) a blocked from transmitting state and (ii) a cleared to transmit state, such that the blocked from transmitting state is a state in which at least one uncleared block message has been received by the ready node, and the cleared to transmit state is a state in which no uncleared block messages have been received at the ready node;

performing a block/clear operation by selectively sending at least one of (i) further block messages and (ii) clear messages to the at least one neighboring node based on the transmission state of each of the at least one neighboring nodes, the clear message clearing a previously sent block message;

repeating the performing a block/clear operation step for a number of iterations; and receiving transmissions over a payload channel in the clear to transmit state.

20. The method of claim 19, the block operation comprising:

determining a priority number for each ready node neighboring the destination node;

determining a priority number for the destination node if the destination node is also a ready node; determining nodes to be blocked based on the determined priority numbers; and sending a block message to each of the nodes to be blocked.

21. The method of claim 20, the determining nodes to be blocked step comprising:

determining a node with a highest priority number among a set, the set containing the priority number for each of the ready nodes neighboring the destination node and the destination node, if the destination node is a ready node;

determining to block ready nodes requesting permission to transmit to the destination node if the destination node is determined to have the highest priority number among the set;

determining to block the ready nodes neighboring the destination node requesting permission to transmit to the destination node if the node with the highest priority number among the set has requested permission to transmit to a node other than the destination node; and determining to block ready nodes neighboring the destination node, except for a particular ready node, if the particular ready node is determined to have the highest priority number among the set, and if the particular ready node requested permission to transmit to the destination node.

22. The method of claim 19, wherein the performing a block/clear operation step further comprises:

selectively sending at least one of (i) block messages and (ii) clear messages to neighboring nodes based on the transmission state of each neighboring node and the transmission priority of each neighboring node.

23. The method of claim 19, wherein the performing a block/clear operation step comprises:
    determining a priority number for each ready node neighboring the destination node;
    determining a priority number for the destination node if the destination node is also a ready node;
    determining a node with a highest priority number among a set, the set containing a priority number for each of the ready nodes neighboring the destination node and the destination node, if the destination node is a ready node;
    determining to block ready nodes requesting permission to transmit to the destination node if the destination node is determined to have the highest priority number among the set;
    determining to block the ready nodes neighboring the destination node requesting permission to transmit to the destination node if the node with the highest priority number among the set has requested permission to transmit to a node other than the destination node;
    determining to block ready nodes neighboring the destination node, except for a particular ready node, if the particular ready node is the determined to have the highest priority number among the set, and the particular ready node requested permission to transmit to the destination node;
    determining to clear the ready nodes neighboring the destination node that have requested permission to transmit to a node other than the destination node if no nodes neighboring the destination node are in the cleared to transmit state, and the node with the highest priority number requested permission to transmit to the node other than the destination node; and
    determining to clear an identified node neighboring the destination node if no nodes neighboring the destination node are in the cleared to transmit state, and the identified neighboring node requests permission to transmit to the destination node, the identified neighboring node being the node neighboring the destination node with the highest priority number.

24. The method of claim 19, further comprising:
    sending, from the destination node, an acknowledgement over the payload channel.

25. The method of claim 20, wherein the determining a priority number step determines the priority number based on a serial number of each of the at least one ready nodes.

26. The method of claim 25, wherein the determining the priority number step determines the priority number based on the serial number of the ready node and an additional serial number of the destination node.

27. The method of claim 20, wherein the determining the priority number step determines the priority number based on a serial number of the destination node.

28. The method of claim 20, wherein the determining a priority number step uses a feedback shift register at each of the at least one ready nodes to generate different priority numbers.

29. The method of claim 28, wherein the feedback shift register is clocked at the timeslot rate.

30. The method of claim 20, wherein the determining a priority number step uses a feedback shift register at the at least one ready nodes to generate the priority number.

31. The method of claim 29, wherein the feedback shift register is clocked at the timeslot rate.

32. The method of claim 19, wherein the control channel and payload channel are orthogonal channels.

33. A method of managing transmission in a wireless network at a ready node, comprising:
    sending a request for permission to transmit from a ready node, the ready node being a node prepared to transmit, and the request (i) identifying at least one destination node, and (ii) being sent over a control channel;
    awaiting reception of a block message or a clear message after the sending;
    performing an announce operation, based on the reception, by announcing a transmission state of the ready node, the transmission state being one of (i) a blocked from transmitting state and (ii) a cleared to transmit state, such that
        the blocked from transmitting state is a state in which at least one uncleared block message has been received by the ready node, and
        the cleared to transmit state is a state in which no uncleared block messages have been received by the ready node;
    repeating the performing step for a number of iterations; and
    sending transmissions over a payload channel in the clear to transmit state.

34. The method of claim 33, wherein:
    the control channel is divided into timeslots, each timeslot is divided into minislots, and each minislot is divided into microslots; and
    the request for permission to transmit sent by the ready node is sent at an assigned microslot.

35. The method of claim 34, further comprising:
    advertising assignment of microslots to the ready node and to one-slot neighbors of the ready node over a contention channel;
    detecting conflicts with microslot assignments; and
    choosing randomly a replacement microslot from unused microslots if a conflict is detected.

36. The method of claim 33, wherein the announce operation at the ready node comprises:
    sending a first announce message indicating the ready node is in the blocked from transmission state if the ready node has received at least one uncleared block message; and
    sending a second announce message indicating the ready node is in the cleared to transmit state if the ready node has not received at least one uncleared block message.

* * * * *